W. BLAKE.
MODE OF CLEANSING GALVANIZED IRON SCREWS OR TUBES.

No. 29,663. Patented Aug. 21, 1860.

Witnesses.

Inventor:
Wm Blake

UNITED STATES PATENT OFFICE.

WILLIAM BLAKE, OF BOSTON, MASSACHUSETTS.

CLEANSING GALVANIZED IRON PIPES.

Specification of Letters Patent No. 29,663, dated August 21, 1860.

*To all whom it may concern:*

Be it known that I, WILLIAM BLAKE, of Boston, in the county of Suffolk and State of Massachusetts, have invented a new and useful mode or process of cleansing the screws of metallic or iron rods or tubes which have been galvanized or had their surfaces covered with zinc, and do hereby declare the same to be described as follows:

The coating of iron with zinc is termed, in the arts, the process of "galvanizing it". Besides plates, bars, and various other articles, it is customary to coat long iron tubes or round rods with zinc, and particularly after they may have had coupling screws cut on them, at their ends. The coating or galvanizing process usually leaves the threads of the screws more or less clogged or covered with a surplus of the zinc, the removal of which becomes necessary before the tubes or rods can be fit for sale or use. The process heretofore adopted for accomplishing such removal of the surplus zinc from the screw threads has been by the use of a screw cutting tool so applied as to cut from the threads the surplus zinc, such process necessarily involving a considerable amount of labor and expense.

I have discovered or invented a simpler, cheaper, and sufficiently effective mode of producing such a result.

In carrying out my invention I employ heat as an essential feature or part of it, that is to say, I heat the galvanized tube or rod up to a degree which will render the zinc or covering metal which may be on the screw thread, readily removable therefrom by friction, or in other words, by a stiff brush or its equivalent, either rubbed against or held against it while the tube or rod may be in rapid revolution on its axis. This application of heat, may be made, either at the time the rod or tube is being galvanized or it may be done at a subsequent period. I prefer, for the sake of economy, to heat the rod or tube by the galvanizing metal, and after such rod or tube has been galvanized and while it may retain the heat of the galvanization, I subject it to a rapid rotary motion on its axis at the same time holding against its screw a stiff brush or the equivalent thereof. The heat, the brush and the rotary motion of the rod by their conjoint action will effect the removal of the surplus metal and in course of a very short period of time.

Figure 1:
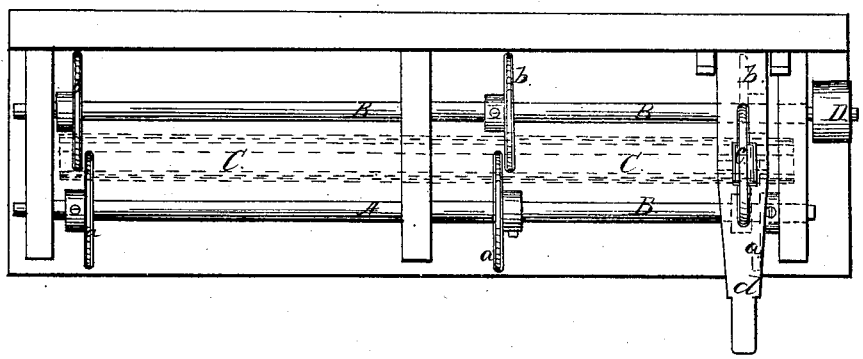
Figure 2:
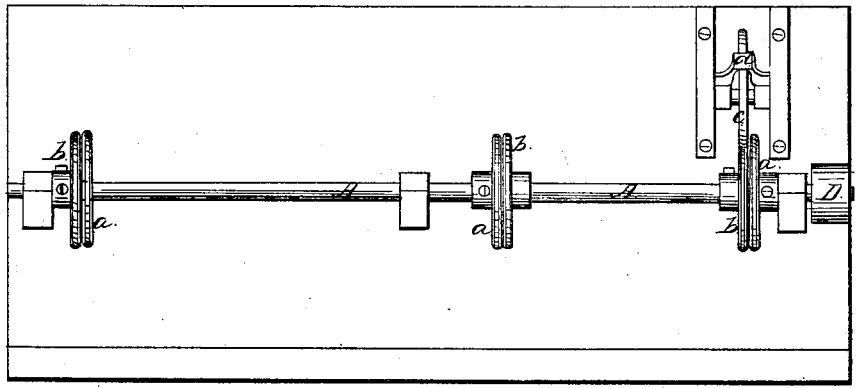
Figure 3:
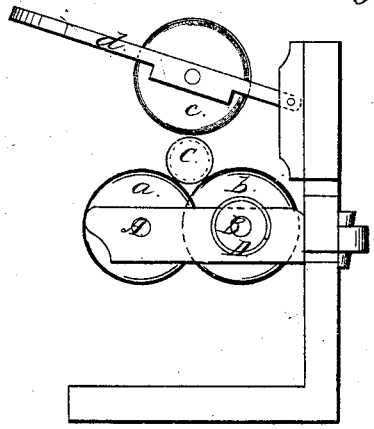

For rotating the round rod or tube, mechanism, as exhibited in Figure 1, in top view, in Fig. 2 in front elevation, and in Fig. 3, in end view may be used. In such figures, A and B, are two long shafts arranged parallel and having their journals supported in suitable bearings or boxes. Each of these shafts carries a set of bearing wheels, $a$, $a$, $a$, or, $b$, $b$, $b$, they being arranged in pairs as shown in the drawings. The two wheels $a$, $b$, of each pair lap on or by one another or are so placed as to enable them to support a tube when placed on and between them as exhibited in red lines at C. Another wheel, $c$, carried by a lever, $d$, is arranged near to one pair of the said bearing wheels, and so as to be capable of being borne down on the top surface of the tube. One of the shafts, A, B, carries a driving pulley D, around which a belt from a motor should travel for the purpose of putting the shaft in revolution.

The galvanized rod when laid on the wheels and the shaft, A, and its wheels are put in rapid rotation will be put in revolution and in order that the friction of the cleansing brush may not stop the rotation of the rod, the presser wheel, $c$, should be borne down upon such rod so as to increase the friction against it of the periphery of the driving wheels.

Having described my invention, what I claim is as follows:

My new process substantially as specified for effecting the removal of the surplus zinc from a galvanized or zinc coated screw, the essential element of such process being the heating of the tube or rod and the putting it in revolution, by means substantially as described, against a brush or equivalent for producing friction.

WM. BLAKE.

Witnesses:
F. P. HALE, Jr.,
W. G. LEVI.